Figure 1:
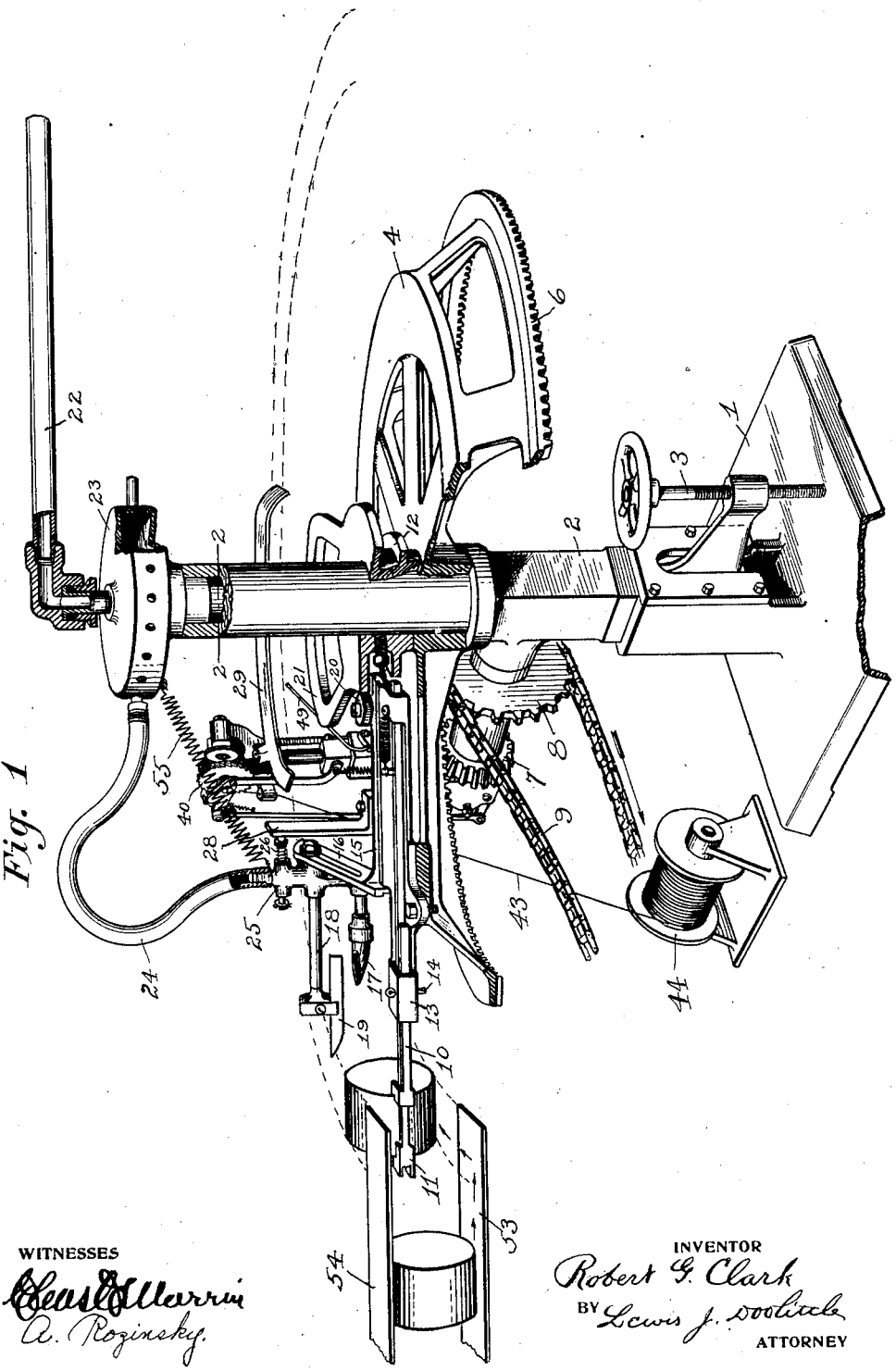

R. G. CLARK.
CAN SOLDERING MACHINE.
APPLICATION FILED OCT. 21, 1912.

1,100,535.

Patented June 16, 1914.
4 SHEETS—SHEET 1.

WITNESSES

INVENTOR
Robert G. Clark
BY Lewis J. Doolittle
ATTORNEY

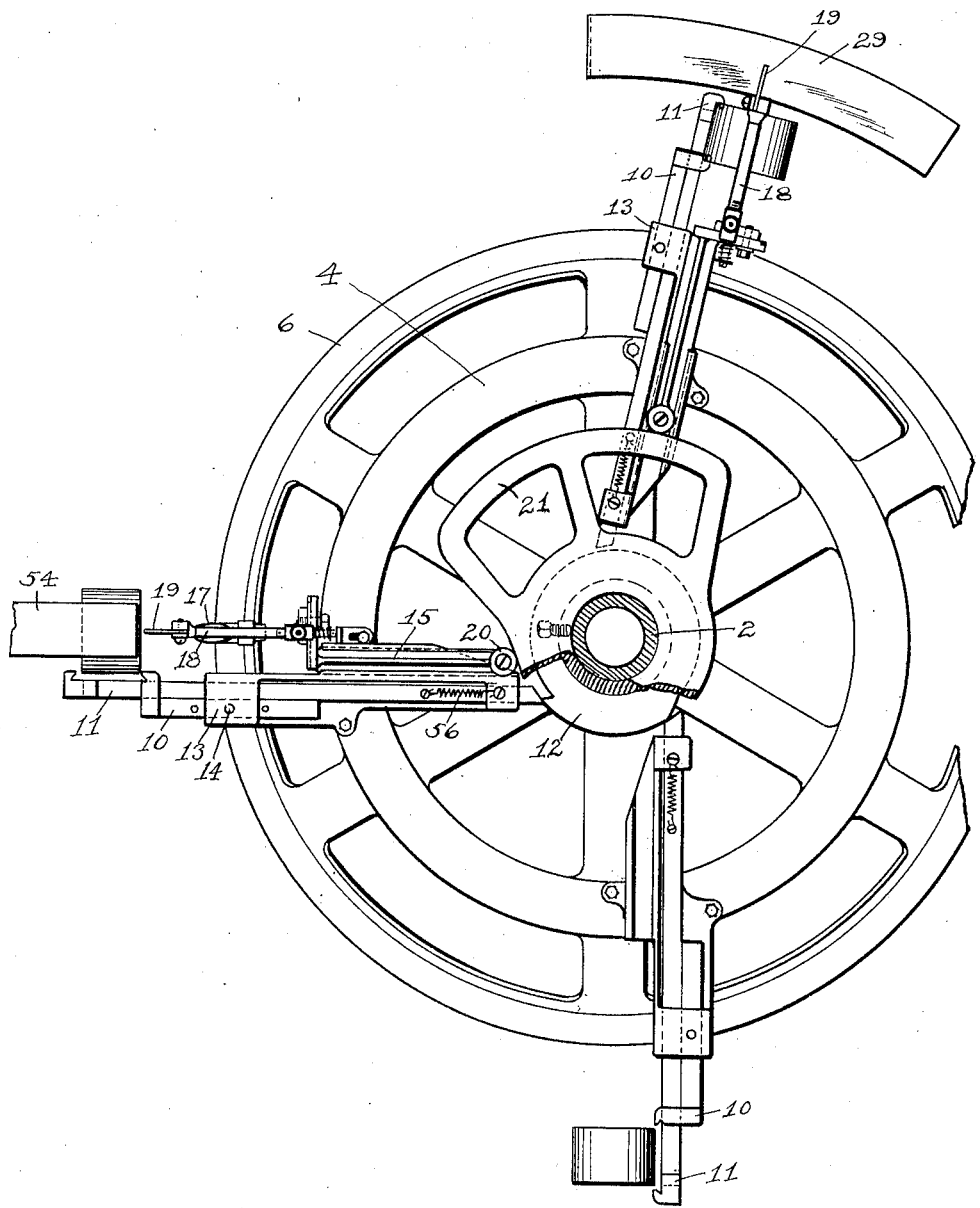

R. G. CLARK.
CAN SOLDERING MACHINE.
APPLICATION FILED OCT. 21, 1912.
1,100,535.
Patented June 16, 1914.
4 SHEETS—SHEET 3.
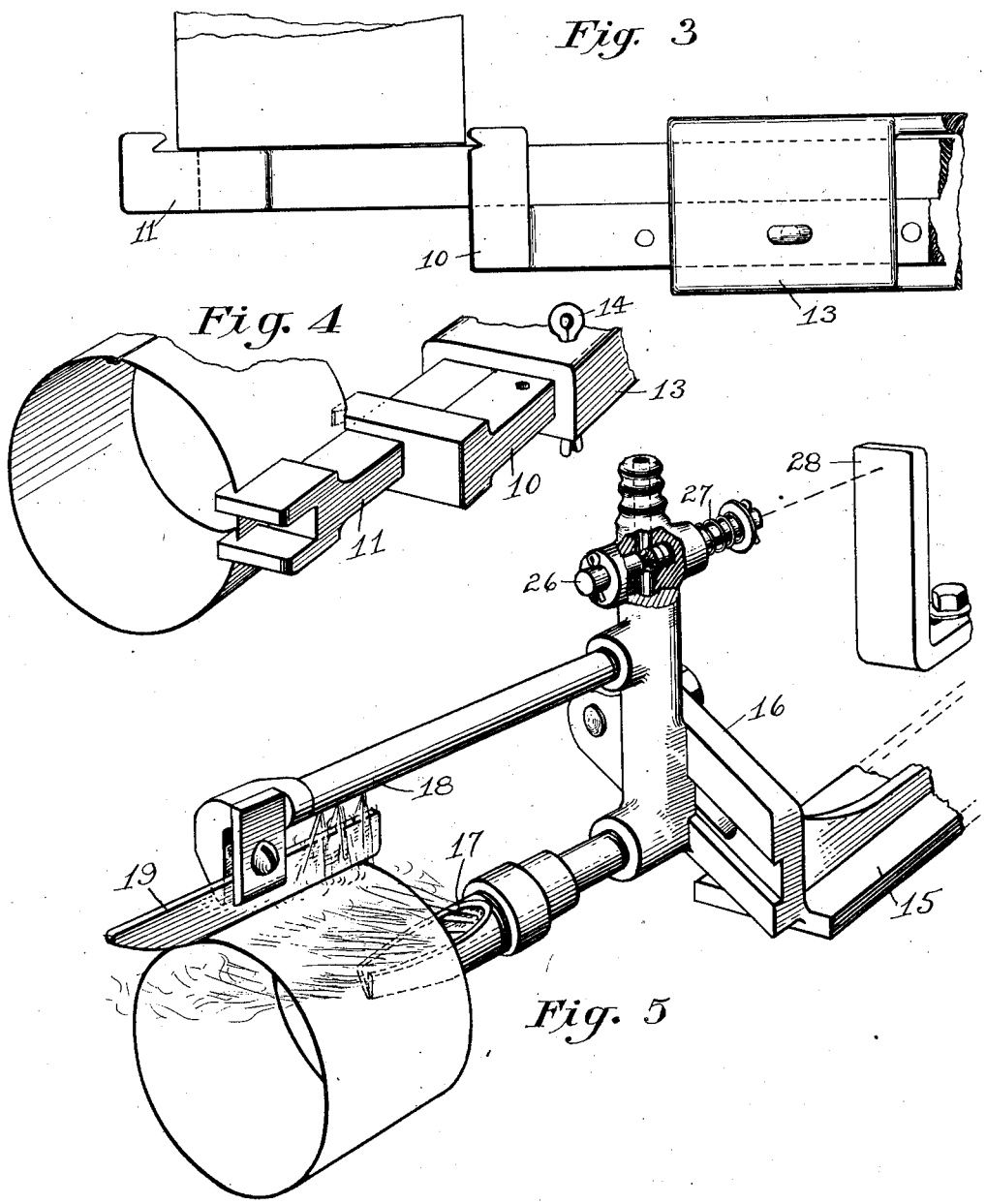
WITNESSES
INVENTOR
Robert G. Clark
BY Lewis J. Doolittle
ATTORNEY

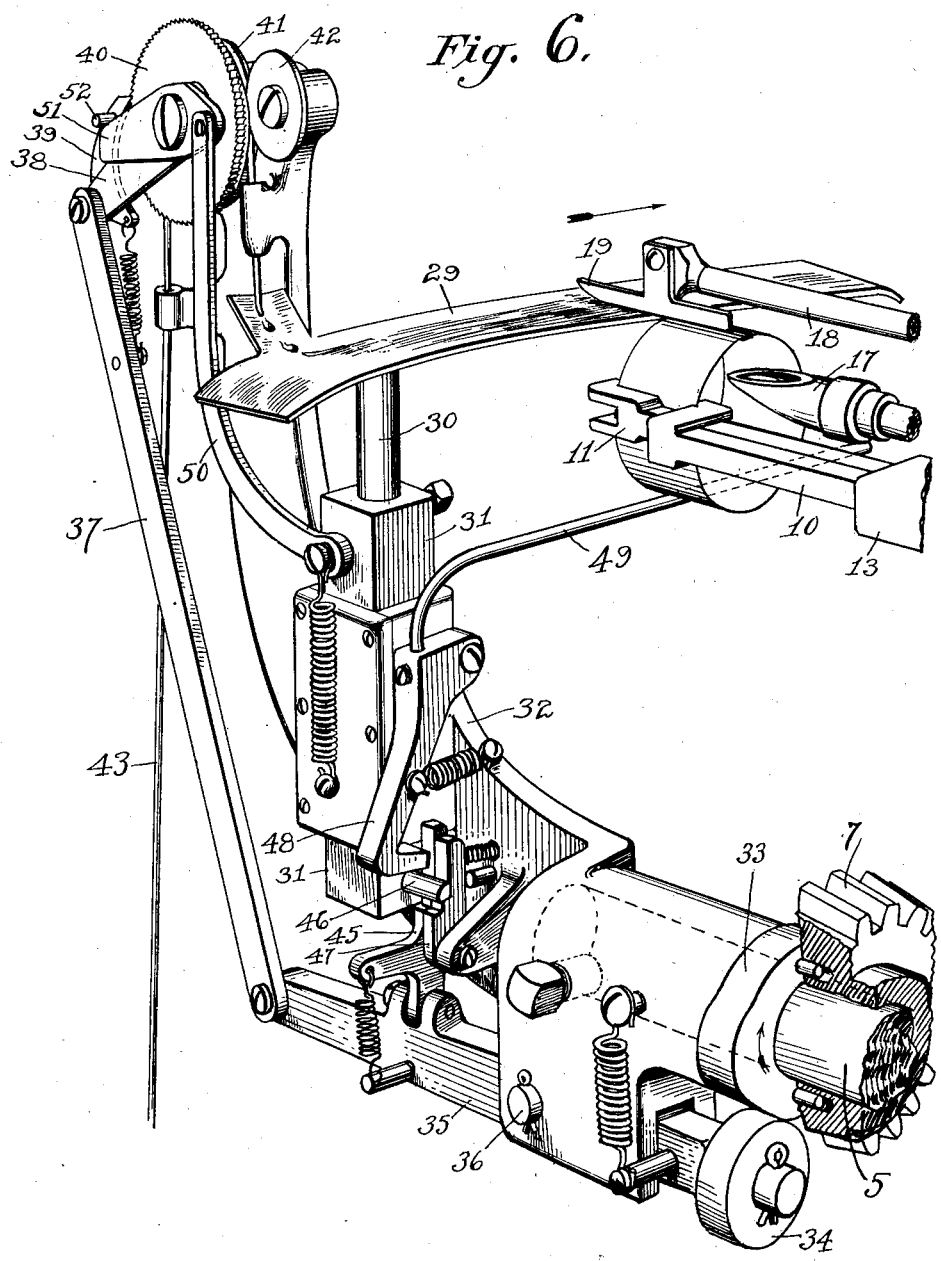

UNITED STATES PATENT OFFICE.

ROBERT G. CLARK, OF NEW YORK, N. Y.

CAN-SOLDERING MACHINE.

1,100,535.  Specification of Letters Patent.  Patented June 16, 1914.

Application filed October 21, 1912.  Serial No. 726,956.

*To all whom it may concern:*

Be it known that I, ROBERT G. CLARK, a citizen of the United States, and resident of the city of New York, borough of Brooklyn, county of Kings, and State of New York, have invented certain new and useful Improvements in Can-Soldering Machines, of which the following is a specification.

This invention relates to a soldering machine adapted particularly to solder the seam in metal can-bodies.

The object of the invention is to provide a simple and efficient machine for the purpose above specified and with which it will be possible to solder a large number of can bodies in a given time and to insure the efficient operation of the same.

In carrying out my invention, I provide means for heating the can body from both the inside and outside at the seam and also for applying only sufficient molten solder to the seam to secure a perfect joint.

The invention as illustrated in the accompanying drawings comprises a rotary table upon which is carried the gripping mechanism and burners, together with the soldering iron, operated by suitable mechanism in connection with means for supplying the molten solder to the soldering iron, all of which will be described more fully hereinafter in connection with the description of the machine as shown in the accompanying drawings.

The several novel features of the invention will appear more fully hereinafter in connection with the said description and be defined in the claims.

Like parts in the several views of the drawings have been given the same reference numerals.

Figure 1 is a perspective view, partly broken away, of a can soldering machine embodying the invention. Fig. 2 is a plan view of a part of Fig. 1. Fig. 3 is an enlarged fragmentary plan view of the gripping mechanism. Fig. 4 is a perspective view of Fig. 3. Fig. 5 is an enlarged fragmentary perspective view showing the heating device and soldering iron. Fig. 6 is an enlarged fragmentary perspective view of the mechanism for supplying the molten solder.

Referring to Fig. 1, the mechanism is shown as mounted on a suitable bed or base 1. An upright support 2 is carried by the base 1 and arranged to be raised and lowered by means of the adjusting screw 3.

A rotary table 4 is mounted upon the upright support 2 and is provided with a bevel gear 6 at its periphery which is engaged by a pinion 7, driven by a sprocket wheel 8 and chain 9, to rotate the table 4, as shown in Fig. 1. Upon the table 4 is mounted the gripping mechanism for holding the can bodies. This gripping mechanism comprises a pair of jaws, one of which may be a stationary jaw 10 and the other a movable jaw 11 operated by the fixed cam 12 which engages the inner end thereof, the cam 12 being fixed in position upon the upright support 2. The stationary jaw 10 is adjustable and is held in the guide 13 by any suitable means, such as the cotter pin 14 inserted through one of a series of holes in the jaw 10 and the guide 13 mounted upon the table 4, as shown in Figs. 1 and 4.

The heating and soldering iron attachment is mounted upon the rotary table 4 by means of the slide 15 carried in the guide member 13, the latter being attached to the table 4. The slide 15 is provided with an extension 16, extending at an angle of 45 degrees therefrom for round cans, upon which the lower burner 17 and the upper burner 18, together with a soldering iron 19, are adjustably mounted, as shown in Figs. 1 and 5.

The inner end of the slide 15 carries a roller 20 which engages a cam 21, which is fixed in position upon the upright 2, for moving the slide 15 and the mechanism carried thereby in and out as the table 4 is rotated.

The gas for the heating mechanism or burners 17 and 18 may be supplied in any suitable manner, such as shown in Fig. 1 from a pipe 22 to a distributing reservoir 23 and through a flexible connection 24 and valve 25 to the burners. The valve 25 is provided with a cut-off in the form of a sliding rod 26 which is normally held in its open position by means of a spring 27 when the heating mechanism is in its outermost position, as shown in Fig. 5, but is arranged so that when these parts are returned to their inner position, as shown in Fig. 1, the rod 26 is engaged by a fixed stop 28, mounted on the table 4, and is moved so as to shut off the gas supply to an amount sufficient enough to keep a small flame burning.

The gripping mechanism, together with the heating mechanism and soldering iron just described, may be considered as a unit for operating upon one can body and it will be understood that a sufficient number of these units may be mounted upon the table 4 to provide the necessary output. The gas reservoir 23 is mounted so as to be rotated upon the upright support 2 with the mechanism just described and is provided with a suitable connection with the supply pipe 22 to permit such rotation.

The means for supplying the solder to the soldering iron are shown in Fig. 6. A supply plate 29 is supported upon a post 30, which is adjustably mounted in a vertical slide 31 carried by the frame 32 mounted upon the extension 5 from the main frame 2, which extension also carries the pinion 7 and the sprocket 8. A cam 33 is attached to the pinion 7 and operates upon a cam roll 34 mounted upon the end of a lever 35, which is pivotally mounted at 36 upon the frame 32. A link 37 connects the opposite end of the lever 35 with an oscillating arm 38, carrying a pawl 39 which engages and operates the ratchet wheel 40 and a feeding drum 41, by means of which the solder 43 is fed over the drum 41 between it and the roller 42 from the spool 44, the spool 44 being shown in Fig. 1.

In order to prevent the soldering iron 19 from becoming attached to the plate 29 should the machine be stopped with the soldering iron in contact therewith, and also to prevent the solder from being fed to the plate 29 should the machine be operated or started without any can bodies therein, a lifting latch 45 is pivotally mounted upon the lever 35 and normally held by means of a spring in engagement with the pin 46 upon the slide 31. A holding or supporting latch 47 is pivotally mounted upon the frame 32 and is also normally held in engagement with the pin 46 by means of a spring, as shown in Fig. 6. A releasing lever 48 is pivotally mounted upon the frame 32 and is provided with an extension 49 positioned in the path of the can body and held thereby in the position shown in Fig. 6, in which position it is out of engagement with the lifting latch 45 and holding latch 47.

As long as can bodies are carried by the gripping jaws 10 and 11, the same will hold the releasing lever 48 in the position shown but when there are no can bodies carried around by the machine the releasing lever 48 will be brought against the latches 45 and 47, by means of a spring attached thereto as shown, and will move the same out of engagement with the pin 46, allowing the slide 31 and parts carried thereby to drop to a lower position, determined by the lower notch on the latch 47. This carries the supply plate 29 out of engagement with the soldering iron 19 and also, by means of the link 50, moves the cam 51 against the pin 52 of the pawl 39 and moves the latter out of engagement with the ratchet wheel 40, thus preventing the feeding of the solder. As soon as can bodies are again supplied to the soldering machine, the same engage the extension 49 of the releasing lever 48 and moves the lower end thereof out of engagement with the latches 45 and 47. The lifting latch 45, which is oscillated vertically by the cam lever 35, now raises the slide 31 back to its former position where it is held by the upper notch of the holding latch 47, which is the position shown in Fig. 6. This movement also causes the link 50 to move the cam 51 out of engagement with the pin 52, permitting the pawl 39 to operate the ratchet wheel 40 and the solder feeding drum 41.

It is preferred to have the extension 49 of such a length that when the can bodies are being supplied continuously to the machine one of the same will come into engagement with the forward end of the extension before the preceding one has passed out of engagement with the rear end of the same, thus holding the releasing lever 48 always out of engagement with the latches 45 and 47 and maintaining the parts in their operative positions.

The operation of the device is as follows: The can-bodies are delivered from the can forming machine between the slides or holders 53 and 54, (Figs 1 and 2) or the same may be supplied by any suitable means. The gripping members carried by the rotating table 4 and operated by the cam 12 grip the can body at one side, the table being adjusted to the required height by means of the adjusting screw 3. The movable jaw 11 is moved outwardly by the cam 12, as shown at the left of Fig. 2 and in Fig. 3, and upon reaching the can body is drawn back by the spring 56, causing the can body to be gripped between the jaws 10 and 11 as shown in Figs. 1 and 4, the stationary jaw 10 having first been adjusted for the width of the can body. The cam 21 now operates the slide 15 and moves the burners 17 and 18 or heating devices and the soldering iron 19 outwardly in a radial direction and opening the valve 25, so that the flames from the burners impinge upon the inside and outside of the can body and the seam thereof to be soldered. The flames from the burner 18 also heat the soldering iron, as shown in Fig. 5.

The soldering iron 19 is carried beyond the can body and as the table 4 is rotated further the soldering iron passes over the surface of the plate 29, picking up the requisite amount of solder, which is automatically fed thereto, as shown in Fig. 6, and melted by the hot plate, which is heated by the flames from the burners 17 and 18, and upon a further rotation of the table 4 is drawn over the seam in the can by the returning movement of the soldering iron caused by the spring 55, moving the parts over the opposite side of the cam 21, as shown at the top of Fig. 2. A further movement of the machine causes the cam 12 to move the jaw 11 outwardly and releases the can body, as shown at the bottom of Fig. 2. The heating device and soldering iron are omitted in this portion of Fig. 2 and it will be also understood that any number of the unit devices, consisting of the gripping mechanism, heating device and soldering iron, may be mounted upon the revolving table 4 and operated successively in the manner just described.

The adjustable jaw 10 may be moved to accommodate can bodies of different lengths and the adjustment provided by the slotted extension 16 permits the machine to be adjusted for can bodies of different diameters, thus enabling one machine to be used for cans of various sizes.

It has been found that the heat being simultaneously applied to both the inside and outside of the seam, the metal is heated more rapidly and uniformly, resulting in a more perfect joint being formed when the solder is applied and also resulting in an increased output, it being possible to operate a machine such as described at a speed which will deliver 150 to 200 cans a minute, all perfectly soldered.

With the construction described it will be seen that the solder is deposited only on the outside of the can. The construction of what is known as "sanitary" cans with the "lock and lap" seam renders it extremely difficult to form a perfectly soldered joint with the ordinary soldering means but on account of the uniform and thorough heating of the seam with this machine the difficulty is avoided.

As many changes could be made in the above construction and many apparently widely different embodiments of my invention designed without departing from the scope thereof as defined in the appended claims, it is intended that all matter herein contained or described or shown in the accompanying drawings shall be interpreted as illustrative merely of an operative embodiment of my invention and not in a limiting sense.

What I claim is:

1. In a can soldering machine, in combination, a rotary table, a pair of gripping jaws mounted upon said table for holding the can during the operation of soldering, means for moving one of said jaws to cause the same to engage the can and to release the same after the operation of soldering, heating means movably mounted upon said table and adapted to apply the heat to the inside and outside of the can, means for moving said heating means into and out of operative position with relation to said can, and means for applying the solder to the seam of the can.

2. In a can soldering machine, in combination, a rotary table, mechanism carried by said table for holding the can during the operation of the soldering, heating means carried by said table for applying the heat to the inside and outside of the can simultaneously, a soldering iron heated by said heating means and adapted to be moved over the outside of the seam of said can, means for moving said soldering iron, and means for supplying solder to said soldering iron.

3. In a can soldering machine, in combination, a rotary table, mechanism carried by said table for holding the can during the operation of the soldering, heating means adapted to be moved into operative position to apply heat to the inside and outside of the can simultaneously, a soldering iron adapted to be moved over the seam of said can, means for moving said heating means and soldering iron, and means for supplying solder to said soldering iron.

4. In a can soldering machine, in combination, a rotary table, gripping jaws carried by said table one of said jaws being adjustable and the other movable and adapted to hold the can during the operation of the soldering, a cam for operating said movable jaw to release the can after the same is soldered, heating means for applying the heat to the inside and outside of the can simultaneously, a soldering iron heated by said heating means and adapted to apply the solder to the seam of the can, means for operating said soldering iron, and means for supplying the solder thereto.

5. In a can soldering machine, in combination, a rotary table, mechanism carried by said table for holding the can during the operation of soldering, burners carried by said table and adapted to be moved simultaneously inside and outside of said can, a soldering iron adapted to be moved over the seam of said can, means for moving said burners and soldering iron, and means for supplying solder to said soldering iron.

6. In a can soldering machine, in combination, mechanism for holding the can during the operation of soldering, heating means for applying the heat to the seam of said can, a soldering iron for applying the solder to the seam of said can, a heated plate upon which the solder is melted and supplied to said soldering iron, means for supplying solder to said heated plate and means for preventing the operation of said last named means where no can bodies are carried by said holding mechanism.

7. In a can soldering machine, in combination, mechanism for holding the can during the operation of soldering, heating means for applying the heat to the seam of said can, a soldering iron heated by said heating means, a plate heated by said heating means upon which the solder is melted and supplied to the soldering iron, means controlled by the can carried by said holding mechanism for holding said plate in position to be engaged by said soldering iron to supply the solder thereto, said last named means also being adapted to cause said plate to be moved out of said position when no can bodies are carried by said holding mechanism.

8. In a can soldering machine, in combination, mechanism for holding the can during the operation of soldering, heating means for applying the heat to the seam of said can, a soldering iron heated by said heating means, a plate heated by said heating means upon which the solder is melted and supplied to the soldering iron, means controlled by the can carried by said holding mechanism for holding said plate in position to be engaged by said soldering iron to supply the solder thereto, said last named means also being adapted to cause said plate to be moved out of said position when no can bodies are carried by said holding mechanism, and means controlled by said last named means for supplying solder to said plate.

9. In combination with a can soldering machine, a vertically movable plate upon which the solder is melted, a soldering iron, means for holding said plate in its operative position for supplying solder to the soldering iron, means for releasing said plate, means for moving said plate when released to an inoperative position out of engagement with said soldering iron, means for feeding solder to said plate, and means controlled by the movement of said plate to prevent the operation of said feeding means when the plate is in its operative position.

10. In a can soldering machine, in combination, a rotary table, a plurality of unit devices rotatively mounted upon said table, each of said unit devices comprising gripping mechanism for holding the can during the operation of soldering, a soldering iron, burners adapted to be moved relative to the can to cause the flames to impinge upon the inside and outside of the can, means for moving said burners and soldering iron relative to the can, a heated plate upon which the solder is melted positioned in the path of said soldering iron and adapted to supply the solder thereto, means for feeding solder to said plate, and means for controlling the operation of said feeding means, to prevent the feeding of solder when no can bodies are carried by said gripping mechanism.

Signed at the city of New York, in the county of and State of New York, this 12th day of Oct., 1912.

ROBERT G. CLARK.

Witnesses:
LUELLA F. LITTLE,
LEWIS J. DOOLITTLE.